(12) United States Patent
Fischer

(10) Patent No.: US 6,640,325 B1
(45) Date of Patent: Oct. 28, 2003

(54) IMMEDIATE NEGATIVE ACKNOWLEDGEMENT FOR A COMMUNICATION NETWORK

(75) Inventor: Matthew J. Fischer, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/577,677

(22) Filed: May 22, 2000

Related U.S. Application Data

(60) Provisional application No. 60/137,427, filed on Jun. 4, 1999.

(51) Int. Cl.[7] ............................................. G08C 25/02
(52) U.S. Cl. ....................................... 714/748; 709/232
(58) Field of Search ........................ 710/109; 714/748; 709/237, 232; 370/390, 313; 455/462

(56) References Cited

U.S. PATENT DOCUMENTS

| | | | | |
|---|---|---|---|---|
| 4,888,684 A | * | 12/1989 | Lilja et al. .................. | 710/109 |
| 4,959,833 A | * | 9/1990 | Mercola et al. ............. | 714/748 |
| 5,378,067 A | * | 1/1995 | Severson et al. ........... | 709/237 |
| 5,459,725 A | * | 10/1995 | Bodner et al. .............. | 370/390 |
| 5,592,536 A | * | 1/1997 | Parkerson et al. .......... | 455/462 |
| 6,058,106 A | * | 5/2000 | Cudak et al. ............... | 370/313 |

* cited by examiner

*Primary Examiner*—David Ton

(57) ABSTRACT

A method and system for providing a low-level recovery of data on a communication network that provides an immediate negative acknowledgement of a data packet that contains bit errors, as determined by a receiving node on the network. The data packets contain two error detection mechanisms, with the first error detection mechanism being used by the receiving node to determine whether the data packet is uniquely addressed to that receiving node. When this is determined by the receiving node, the data payload is then checked to determine whether it contains a bit error. When an error is detected, the receiving node immediately sends out a negative acknowledgement, prior to the normal interframe spacing provided in network protocols, so that the transmitting node becomes aware that the data packet was not properly received at the receiving node. The transmitting node can then retransmit the data packet.

12 Claims, 5 Drawing Sheets

IMMEDIATE NEGATIVE ACKNOWLEDGEMENT FOR A COMMUNICATION NETWORK

RELATED APPLICATIONS

The present application claims priority from provisional application Serial No. 60/137,427, filed on Jun. 4, 1999.

FIELD OF THE INVENTION

The present invention relates to the field of network communications, and more particularly, to recover data lost in transmission between a transmitting node and a receiving node on a communications network.

DESCRIPTION OF RELATED ART

Bit errors in communication networks can cause the reception of frames with errors. A transmitter is unaware of receive-based errors and moves forward in its queue of data frames. The receiver, unable to recover the data, must drop the frame. Higher layers of the network protocol stack must discover the missing frame and through higher-layer communication, request a retransmission. The efficiency of the network is greatly reduced whenever higher-layer recovery of lost frames is invoked. Some systems employ error correction schemes that allow recovery of data at the receive side and thereby reduce the need for lost packet detection and retransmission. However, such schemes require that some network bandwidth be utilized to support the error correcting code's overhead.

All communication networks are subject to interference, noise and other sources of bit errors. These bit errors lead to a reduction in overall performance, since they cause data packets to be lost, necessitating the re-transmission of packets. Some packets are transmitted twice, or more, thereby decreasing effective network throughput. In fact, however, a larger network performance decrease results from the mechanisms normally used to discover the lost packets and then request a retransmission of the lost packets. Typically, a lost packet is discovered through a software timeout. In other systems, the lost packet can be discovered by matching sequenced numbers in a series of packets and noting where gaps exist in the sequence. In either case, the retransmission of the packet occurs only when the receiver has discovered the missing packet and has then sent a request to sender to re-queue the packet. The sender (i.e. the transmitting node) must maintain a copy of each packet in system memory until it receives confirmation from the receiving node that each packet has been successfully received. This obviously places a greater burden on the transmitting node's system memory, and is exacerbated by delays in the acknowledgement of successful or unsuccessful reception of a packet. In environments with very high bit error rates, even improved systems begin to exhibit degraded performance.

SUMMARY OF THE INVENTION

There is a need for a packet error detection and recovery mechanism that operates at a lower layer in the network protocol stack that reduces the time required to recover from packets lost due to bit errors.

These and other needs are met by embodiments of the present invention which provide a method of recovering data transmitted over a medium of a network from a transmitting node to a receiving node. The method includes examining destination address information of a data packet received at the receiving node to determine whether the data packet was uniquely addressed to that receiving node. A conforming data packet has destination address information and a data payload. It is then determined at the receiving node whether the data payload of the data packet has an error, when the destination address information indicates that the data packet was uniquely addressed to that receiving node. At that point, either the data packet is accepted when the data payload does not have an error, or a negative acknowledgement is immediately sent to the transmitting node when the data payload has an error.

By providing a negative acknowledgement at the medium access layer, in accordance with certain embodiments of the invention, the overhead cost of the network is minimized and the time required to recover from packets due to lost errors is reduced. Performance of the network is thereby improved. The negative acknowledgement, in certain embodiments, occurs only when needed, so that when bit error rates are low, network efficiency remains high.

The earlier stated needs are also met by other embodiments of the invention which provide a system for transmitting and receiving data packets over a communication network between a transmitting node and a receiving node. The system comprises a transmitting node that transmits data packets, each conforming data packet containing destination address information and a data payload. The system also comprises a receiving node that receives the data packets. The receiving node includes logic for determining whether a received data packet is uniquely addressed to that receiving node and determining whether the data payload contains an error. The logic immediately sends a negative acknowledgement when the received data packet is uniquely addressed to that receiving node and the data payload contains an error.

Although the present invention has been described and illustrated in detail, it is to be clearly understood that the same is by way of illustration and example only and is not to be taken by limitation, the scope of the present invention being limited only by the terms of the appended claims.

DETAILED DESCRIPTION OF THE INVENTION

The present invention addresses and solves problems related to bit errors in communication networks that cause the reception of frames with errors and require a high-layer recovery of lost frames. The invention accomplishes this, in part, by providing lower-layer recovery scheme that allows the efficiency of the network to remain extremely high, even in the presence of high bit error rates. A negative acknowledgement scheme is provided at a very low level of network operation, this negative acknowledgement immediately following the reception of a packet that contained bit errors. The receiver determines accurately that the packet was uniquely addressed to it as a condition to sending out a negative acknowledgement if the data payload is detected to have an error contained within it. The negative acknowledgement may be sent immediately following the end of a packet reception, within the time window that guarantees highest priority of access to the negative acknowledgement. The transmitting node, upon detection of the negative acknowledgement, performs a retransmission of its last packet, either in highest-priority fashion, or with normally transmission timing.

Figure 1:
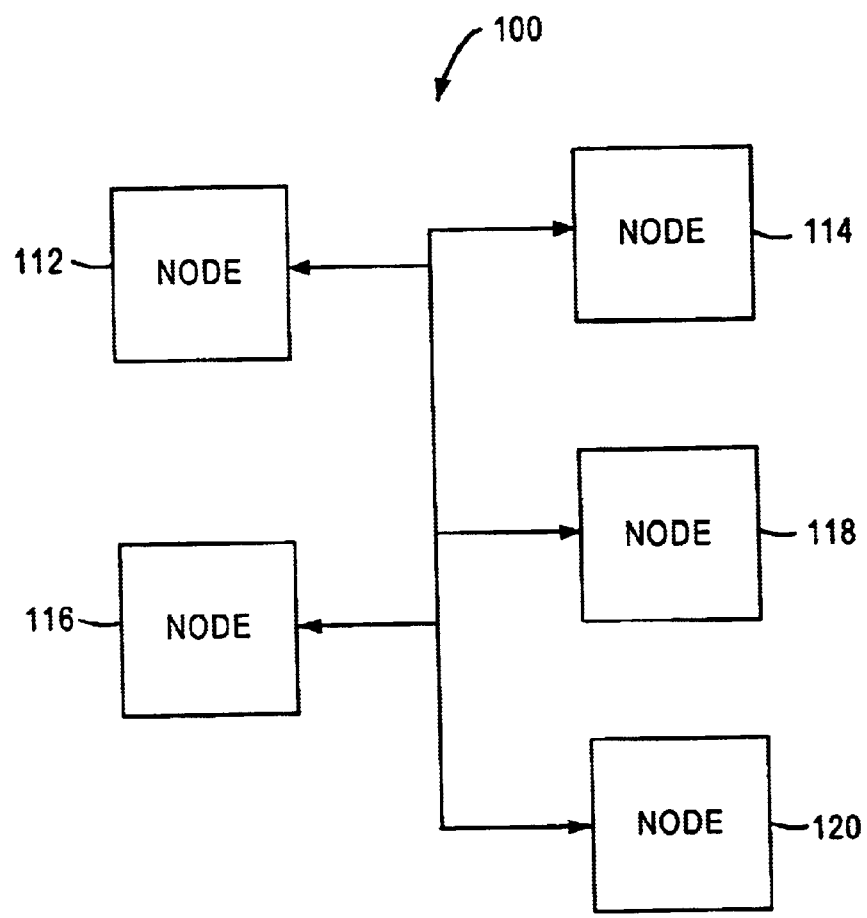
FIG. 1 is a block diagram of an exemplary communications network in accordance with embodiments of the present invention.

FIG. 1 depicts a block diagram of a communication network 100 that uses the embodiments of the present invention. Communication network 100 includes a medium 122 to which a plurality of nodes 112–120 are coupled. In the exemplary embodiment, each of the nodes 112–120 may be a transmitting node or a receiving node at any particularly time, depending on whether it is currently transmitting or receiving data. In the following example and description, the transmitting node of a data packet will be node 112, and the particular receiving node to which the data packet is uniquely addressed is node 120. Each of the other nodes 114–118 receives the signals over the medium 122, but the communications are between the nodes 112 and 120.

As discussed earlier, bit errors in communication networks can cause the reception of frames with errors. The transmitting node 112 is unaware of the receive-based errors and moves forward in its transmission queue after sending the initial frame. The receiving node 120, unable to recover the data, must drop the frame that has errors in it. The receiving node 120 has higher layers of a network protocol stack that must discover this missing frame and through higher-layer communication request a retransmission from the transmitting node 112. This greatly reduces the efficiency of the network by invoking the higher-layer recovery of the lost frame.

The present invention provides a mechanism for lower-layer recovery of the lost frames by the provision of the receiving node 120 sending an immediate negative acknowledgement over the medium 122 to the transmitting node 112, to cause the transmitting node 112 to re-transmit the lost frame. Although some packets may still be lost, such as those with a corrupted header, the number of packets that must be recovered by the less efficient and slower, higher-layer will be reduced, and overall network performance will increase.

Figure 2:
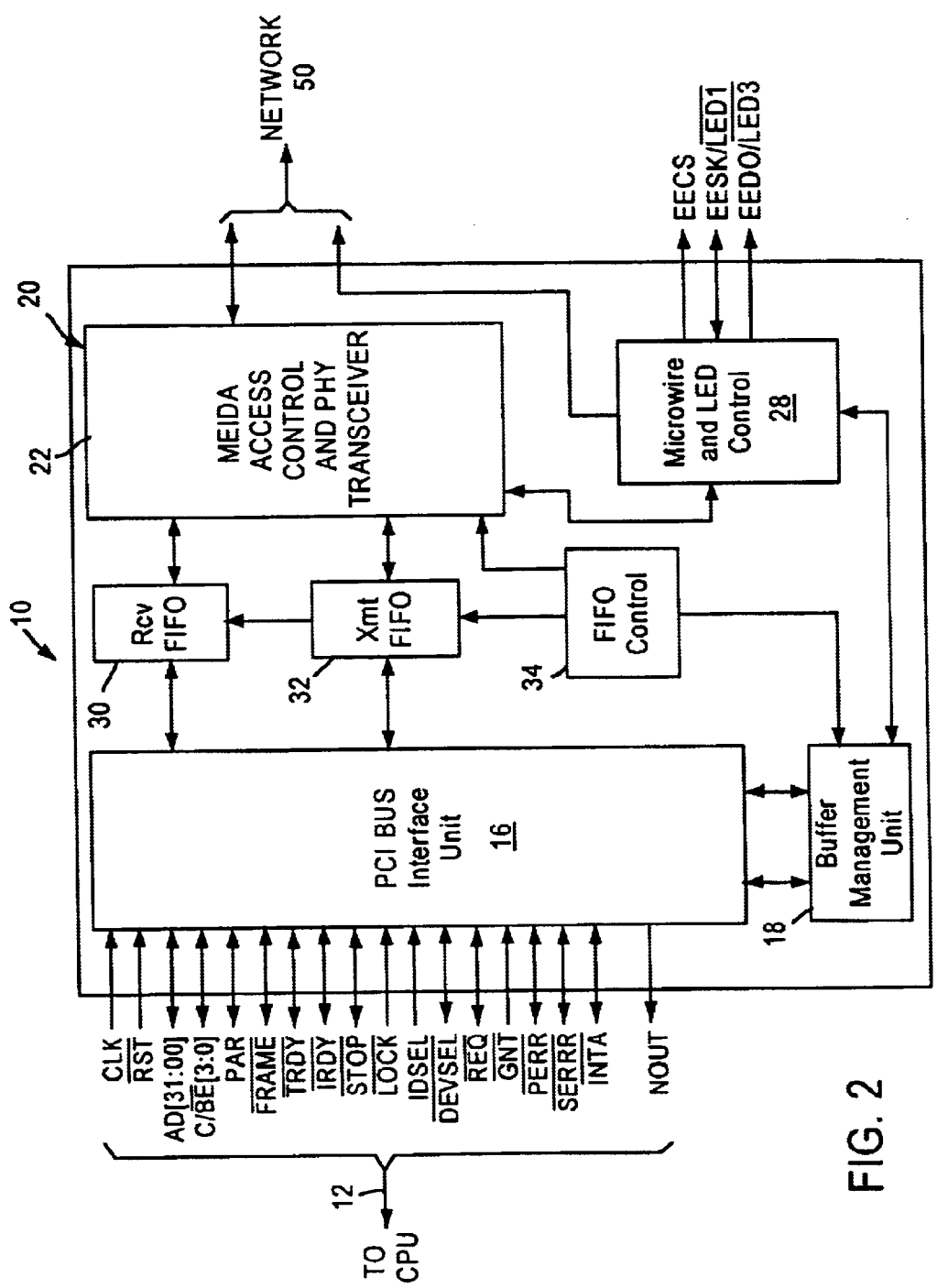
FIG. 2 is a block diagram of an exemplary network interface capable of implementing the present invention.

Before describing the negative acknowledgement method of the present invention in detail, an exemplary embodiment of a network interface will now be described with respect to FIG. 2. An exemplary network is a local area network (LAN) which supports a protected header, where the protection includes the destination address separate from any protection for the payload. The protection refers to error detection capability.

The interface 10 includes a PCI bus interface unit 16, a direct memory access (DMA) buffer management unit 18, and a network interface portion 20 including a media access control (MAC) core 22, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The present invention improves upon existing systems by adding a negative acknowledgement at the medium access layer. The negative acknowledgement occurs only when needed, so that when bit error rates are low, network efficiency remains high. The invention requires modification to existing medium access protocols, but is generally compatible with most existing medium access protocols, and if properly added to an existing protocol, allows backwards compatibility.

The present invention uses a packet header containing the medium access control layer destination address, where the destination address is protected by an error detection mechanism which is separate from the error detection mechanism for the packet payload. The packet payload error detection mechanism may still overlap the packet destination address.

Most protocols include an error detection mechanism that provides coverage of the entire data packet. In the present invention, however, a secondary detection mechanism is provided which covers some subset of the packet that must include the destination address. It is preferred that the subset be smaller, with a minimum requirement being just the destination address and its associated error detection code, although other configurations are within the invention. The normal payload error detection scheme may redundantly cover the destination address.

Since the destination address is a subset of the entire packet, and assuming a random distribution of bit errors, then the probability of a bit error contained solely within the destination address is a fraction of the probability of a bit error being contained in the entire packet. Because of this relationship, it is possible, in a very large percentage of cases, to discover the destination address of a packet which contains a bit error. When the destination address of a packet with an error is known, the intended receiving node 120 can confidently signal for a retransmission of the packet from the transmitting node 112 by sending a negative acknowledgement, knowing that no other node will interfere with that transmission, and knowing that it truly was the intended recipient of the packet.

When the receiving node 120 cannot determine the destination address, due to the presence of an error detected within the destination address (or the subset of a packet which contains the destination address), then a negative acknowledgement cannot be signaled.

Figure 5:
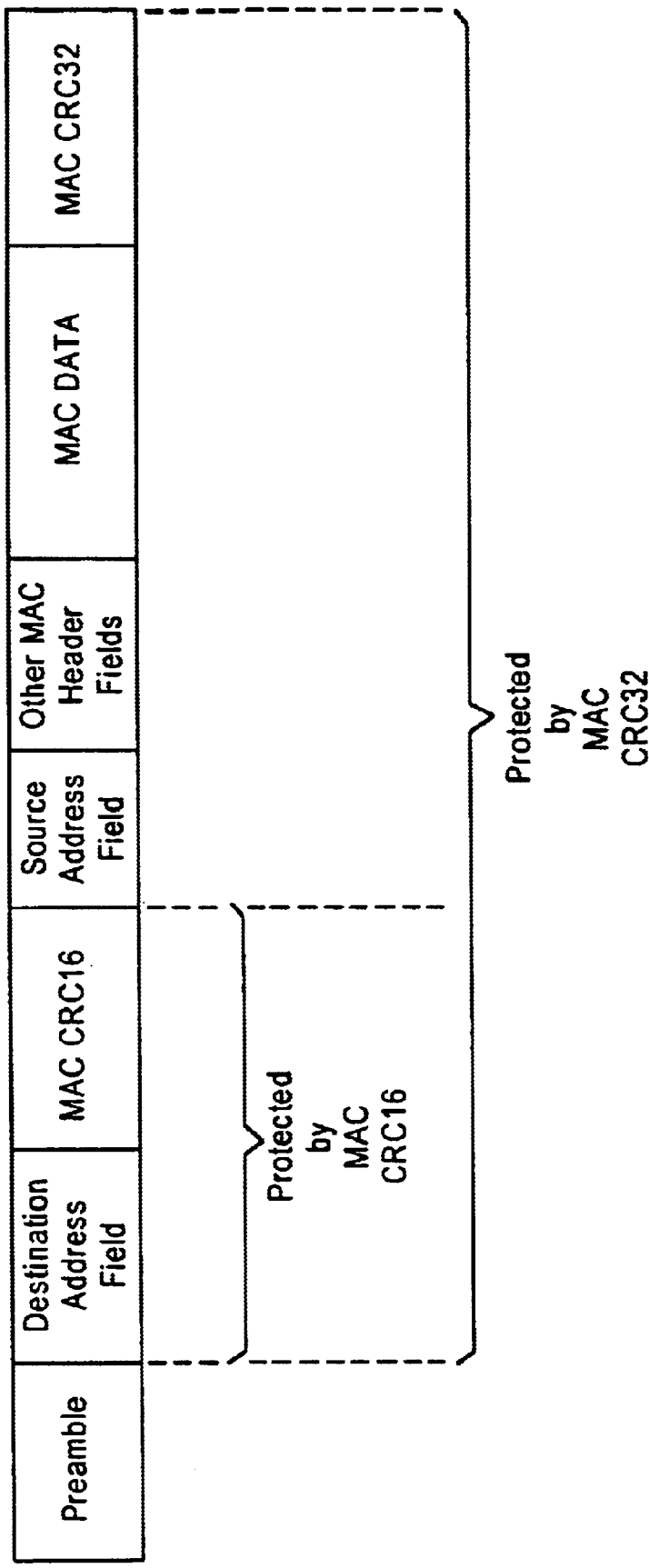
FIG. 5 is a block diagram depicting the form of a packet which has a protected header containing a destination address in accordance with embodiments of the present invention.

FIG. 5 is a depiction of a packet format which has a protective header containing the destination address, in accordance with embodiments of the present invention. As can be seen, the packet includes a preamble, a destination address field and cyclic redundancy check bits (CRC) dedicated to the destination address field area. The source address field identifies the source of the data packet (e.g. transmitting node 112). MAC header fields follow the source address field in the data packet. The data payload, refer to as the MAC data in FIG. 5, follows the MAC header fields. The CRC for the data payload and the entire data packet, not including the preamble, is provided at the end of the data packet.

The receiving node 120, as well as all the other nodes that are compatible with the present invention, is able to recognize bit errors within the packet payload. Each node must be able to determine if there are any bit errors within the packet's payload. Only packets with errors will cause the generation of a negative acknowledgement which requests a retransmission of a data packet.

Each compatible node 112–120 must recognize that the destination address of a packet uniquely identifies that packet as intended solely for the reception by this particular node 112–120. If the address in the scheme does not support unique-node addressing, then it is impossible for a receiving node to determine if it is the sole intended recipient. A node (e.g. receiving node 120) must determine that the address uniquely identifies it as the recipient of the data packet in order to allow a negative acknowledgement to be sent when needed. If a data packet is addressed to multiple nodes (e.g. 114, 118, 120) then no negative acknowledgement should be sent by any of the nodes 114, 118, 120 to which the packet was addressed. If each node 114, 118, 120 were to send a negative acknowledgement, then the multiple negative acknowledgements would potentially collide on the network 100, making the detection of negative acknowledgement difficult or impossible.

Each compatible node 112–120 must be able to recognize that a packet has a valid non-collision length. Most medium access protocols specify a minimum packet length which relates to the collision window of the protocol. A packet which is received with a valid header, but which is shorter than the minimum allowed length of the protocol, is likely to be a collision fragment. The protocol normally contains a mechanism for recovering from the collision, and therefore, no negative acknowledgement should be sent in response to the reception of fragments which are below this minimum length.

Each compatible node 112–120 also must have the ability to generate a negative acknowledgement signal before any other access is normally allowed within the medium access protocol rules. That is, the transmission of the negative acknowledgement indication is given highest priority on the network and immediately follows the transmission of the packet with the bit error. In some existing medium access protocols, this may be as simple as transmitting the acknowledgement signal before the expiration of a proper interframe space. Such interframe spacing, also known as interpacket gaps (IPG) are well-known within the art of network communications.

The negative acknowledgement needs to have priority over all other packets on the network, and must be the next intentionally generated network activity following the reception of the packet by the receiving node (e.g. receiving node 120) of the packet with the bit error. By granting priority to the negative acknowledgement, the retransmission of the packet is performed with the least impact to the latency of delivery of the packet. In addition, an immediate request and retransmission minimizes the buffering and bookkeeping that would otherwise be necessary at each transmitting node. If multiple transmissions could be potentially retransmitted, then the transmitting node 112 would need to keep copies of a specified number of its previously transmitted packets, awaiting the potential arrival of a negative acknowledgement for each of them. In such a scheme, only a timeout or the passing of a retry limit on a packet would allow the transmitting node 112 to erase a copy of any given packet. This is the mechanism used by upper-layer protocols in the prior art to ensure reliable delivery of packets. The overhead and expense of keeping more than one packet buffer after an initial transmission attempt is avoided by the use of the present invention. By giving highest priority on the network to the transmission of the negative acknowledgement, the buffering requirement at the medium access control layer is reduced to a single frame.

In certain embodiments of the invention, the negative acknowledgement signal appears as a modulated signal of a specific length containing a bit pattern which is unique to the negative acknowledgement. In other embodiments, the negative acknowledgement is a validly formed frame that includes a preamble, header and other packet components that might be required by the particular medium access protocol to which the invention has been applied. The exact definition of the signal depends upon the existing medium access protocol to which the present invention is applied and to the character of any potential noise sources which may mimic a negative acknowledgement indication. Proper definition of the signal allows nodes that include the present invention ("compatible nodes") to interoperate with nodes that do not include it. In particular, the negative acknowledgement should not be seen as a normal, acceptable packet to existing nodes (e.g. "legacy nodes" or "non-compatible nodes") which do not implement the invention.

The inclusion of a valid preamble and header as well as other normal packet components will not necessary cause a negative acknowledgement to be received by non-intended legacy nodes which are incapable of properly interpreting the negative acknowledgement. Other restrictions within a protocol will disallow any negative acknowledgement from being received, except by newer nodes that employ the present invention. Such restrictions may include, for example, a minimum packet length. Compatible nodes containing the present invention include an ability to accept properly formed negative acknowledgement packets, but legacy nodes would reject such packets based upon a minimum length restriction, thereby insuring interoperability of the two different types of nodes.

In other embodiments of the invention, to provide for interoperability, a uniquely coded signal is created which violates a normal integrity test of a legacy node, but is uniquely formatted to pass another test that only the compatible nodes are aware of. One example of such a method, in accordance with the present invention, is to use a different preamble and start of frame delimiter than that which is normally employed by legacy nodes, such a combination representing an undecodable reception to the legacy nodes. Another embodiment of the invention forces a CRC error in an otherwise acceptable packet, but provides a correct CRC to occur at some point in the packet which is not the endpoint (a normal location for a CRC). For example, the correct CRC may be provided at one byte from the end of the packet, instead of at the end of the packet. The compatible nodes maintain a previous CRC value and when the packet ends, the compatible nodes check both the current and previous CRC values. If the current CRC value fails, but the previous value passes, then the packet is interpreted by the compatible node as a negative acknowledgement and the packet is not forwarded to higher layers.

Another embodiment of the invention allows specific addressing of the acknowledgement packet, when a packet is used. The destination address for the negative acknowledgement can be extracted from the source address field of the validly received header that was attached to the packet with a payload bit error. This method of the invention works when the receiving node 120 is aware of the capability of the transmitting node 112 to understand the meaning of the negative acknowledgement. In newer protocols, a special packet type can be created to specifically signal the negative acknowledgement.

In certain embodiments of the invention, a retransmission limit counter is provided to limit the number of retransmission attempts that may be made for each packet with specific reference to the retransmissions that are invoked through the negative acknowledgement process. The retransmissions due to the collision activity normally on a network must not be included in this count. There may be relatively long lasting line impairments that hinder the ability of specific nodes of the network to communicate. Such impairments may create conditions of extremely high bit error rates between specific pairs of nodes while leaving more tolerable bit error rates between other pairs of nodes. Given this potential asymmetry in network function, the present invention includes a retransmission counter, in certain embodiments, to prevent communication attempts between high bit error rate pairs of nodes from having a significant impact on the communications between pairs of nodes that do not suffer from similarly high bit error rates.

In addition, some higher-layer protocols may be transmitting packets which do not require reliable delivery. That is, it may be acceptable to lose a certain portion of packets associated with a given application. For example, real-time interactive voice communication is one such application. Because the lower layers of the network do not have knowledge of the delivery requirements of individual packets, it is not desirable to attempt too many retransmissions of packets which the higher layers of the network regard as expendable.

In certain embodiments of the invention, the retransmission of the packet that contains the error is accorded the highest priority status within the medium access protocol. In a completely new protocol, this may be easily be accomplished by forcing all nodes, upon reception of the negative acknowledgement, to create a high-priority network timing event for the purpose of allowing the retransmission. This may only be done when exact reception of the negative acknowledgement can be ascertained by all nodes within the network, for example, as might be determined through a timing event, rather than by relying on packet contents which could be in error. However, in other embodiments, for all protocols (new and existing) the high priority of the retransmission may be created by simply retransmitting the frame before the expiration of a proper interframe space that would otherwise follow the negative acknowledgement.

It is acceptable to allow the retransmission normal priority, the only requirement being that the negative acknowledgement receive the highest priority. Once the negative acknowledgement has been received by the transmitting node (e.g. 112), the transmitting node 112 recognizes that a retransmission has been requested, and it can adjust its transmission queue appropriately. If the retransmission occurs immediately, the latency experienced by the packet is minimized. If the retransmission occurs later, then the packet will experience longer than average latency.

Figure 3:
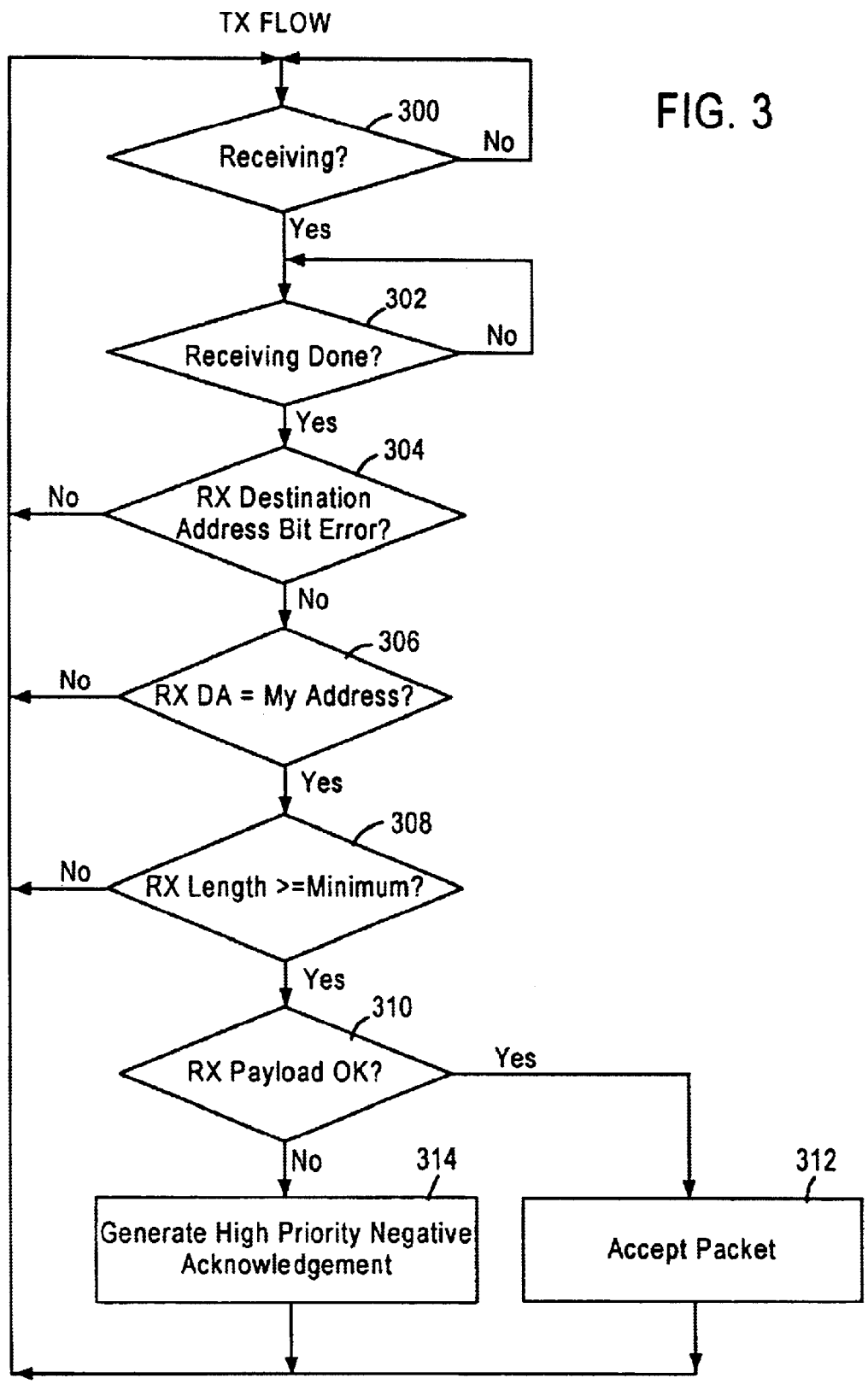
FIG. 3 is a logical flow diagram of an exemplary method of receiving data at a node on a communications network in accordance with embodiments of the present invention.

FIG. 3 is a flow chart of an exemplary method of the present invention for the flow of receiving a data packet at a receiving node. In step 300, it is determined whether the node (e.g. node 120) is receiving a data packet. If the node 120 is not receiving any data over the communication medium 122, (FIG. 1) then the process returns to waiting for the reception of data.

Assuming that the receiving node 120 is receiving data, it is determined in step 302 whether the reception is completed. If not, the process returns to waiting for the reception to be completed. Assuming that the receiving node 120 determines that reception is complete, in step 302, the receiving node 120 then determines whether there is a bit error in the received destination address, in step 304. This is the first error detection mechanism that the receiving node 120 employs in the present invention. If the receiving node determines that there is a bit error in the destination address, in step 304, the process returns to step 300 to await the reception of new data. An immediate negative acknowledgement is not sent out at this time, since the receiving node 120 can not be sure that the data packet was uniquely addressed to that node 120.

If there is no bit error in the destination address, as determined in step 304, the receiving node 120 then determines whether the received destination address is unique to that receiving node 120. This performed in step 306. If the address is not unique to the receiving node 120, the process returns to step 300.

It is determined in step 308 whether the length of the received data packet is greater than or equal to a minimum length. If it is not equal to this minimum length or greater than the minimum length, the process returns to step 300 and the receiving node waits for additional data packets. If, however, the length of the data packet received at the receiving node 120 is greater than or equal to a minimum length, it is next determined in step 310 whether a received data payload has an error. If there is an error in the data payload, a high priority negative acknowledgement is generated by the receiving node 120 in step 314. The receiving node 120 then waits for reception of the next data packet from step 300. If the data payload is determined to be free of error, as performed by the second error detection mechanism in step 310, then the packet is accepted in step 312 and the receiving node 120 returns to step 300 to await reception of the next data packet.

Figure 4:
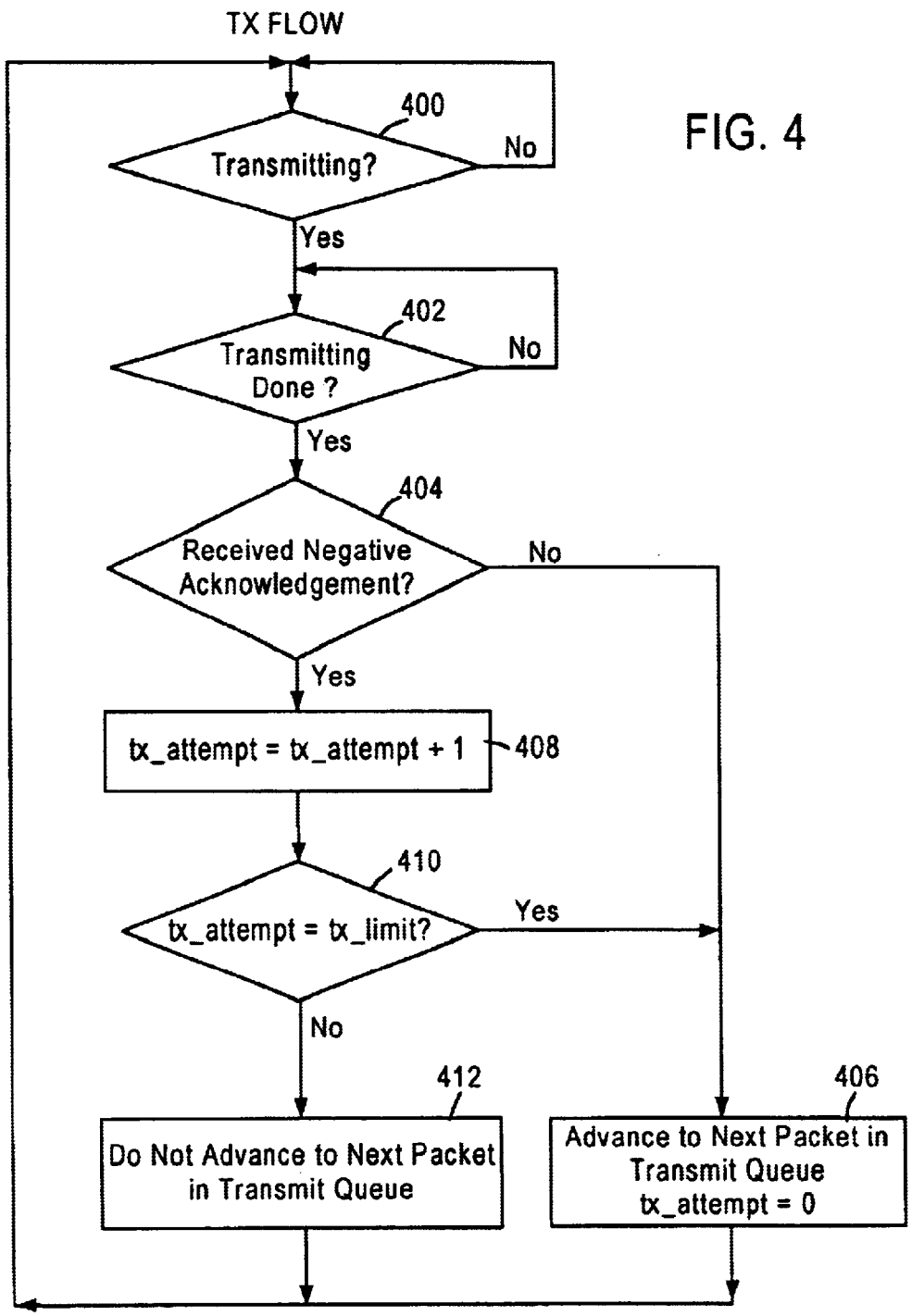
FIG. 4 is a logical flow diagram of the transmitting of data on the communications network by a transmitting node in accordance with embodiments of the present invention.

An exemplary embodiment of the flow of the transmitting side is depicted in FIG. 4, in which the transmitting node 112 determines in step 400 whether it is transmitting a data packet. If no transmission is being performed, the process returns to the input of step 400.

Assuming that the transmitting node 112 is currently transmitting, it is determined in step 402 whether the transmission of a data packet is complete. If this particular transmission is not finished, the process returns to the input of step 402. Once the transmission of a data packet is complete, determined in step 402, it is next determined in step 404 whether a negative acknowledgement has been received at the transmitting node 112. As discussed earlier, the negative acknowledgement is formed on a high priority basis so that the transmitting node 112 only needs to buffer a single frame. If it does not receive a negative acknowledgement within a certain time period, as determined in step 404, the transmitting node 112 advances to the next packet in its transmitting queue and resets the transmit attempt counter to zero, as depicted in step 406. The process then returns to step 400 with next transmission by the transmitting node 112.

If a negative acknowledgement is received by the transmitting node 112 within the time frame specified, the transmission attempt counter is incremented in step 408. In step 410, it is determined whether the transmitting attempt counter value has reached a retransmission limit. If so, the transmitting node 112 advances to the next packet in the transmit queue and resets the transmission attempt counter to zero.

If the retransmission limit has not been reached yet, as determined in step 410, the transmitting node 112 does not advance to the next packet in its transmit queue, but rather retransmits the packet that was not correctly received and the subject of the negative acknowledgement sent by the receiving node 120. The process returns to step 400 to transmit this lost packet.

The present invention thus provides a low-level recovery of frames which improves the efficiency of the network by avoiding higher-level of recovery of frames were possible. It accomplishes this, in part, by providing an additional error detection mechanism, which allows the determination that the receiving node is being uniquely addressed with respect to a data packet. By sending out a negative acknowledgement immediately upon detection of an error in the data payload, once a receiving node determines that the data packet was uniquely addressed to it, a transmitting node need only buffer a single frame of data. If the transmitting node does not receive a negative acknowledgement, the next frame of data may be queued and transmitted in normal fashion. This reduces the buffering required of the transmitting nodes on the communications network.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A method of recovering data transmitted over a medium of a network from a transmitting node to a receiving node, comprising the steps of:

examining destination address information of a data packet received at the receiving node to determine whether the data packet was uniquely addressed to that receiving node, a conforming data packet having destination address information and a data payload;

determining at the receiving node whether the data payload of the data packet has an error, when the destination address information indicates that the data packet was uniquely addressed to that receiving node; and accepting the data packet when the data payload does not have an error; and immediately sending a negative acknowledgement to the transmitting node when the data payload has an error, wherein the transmitting node and the receiving node interpacket time between data packets that each node is normally required to wait before attempting to transmit data on the network, the step of immediately sending a negative acknowledgement including sending the negative acknowledgement prior to expiration of the interpacket time following receipt of the data packet at the receiving node.

2. The method of claim 1, further comprising re-transmitting the data packet from the transmitting node when the transmitting node receives the negative acknowledgement signal.

3. The method of claim 2, wherein the re-transmitting of the data packet includes re-transmitting the data packet prior to expiration of the interpacket time following receipt of the negative acknowledgement at the transmitting node.

4. The method of claim 2, further comprising determining the number of re-transmissions of the same data packet in response to receipt of negative acknowledgements at the transmitting node and preventing further re-transmissions of the same data packet when the number of re-transmissions reaches a threshold number.

5. The method of claim 1, further comprising encoding the negative acknowledgement such that data packet integrity tests of the negative acknowledgement signal by nodes that are non-compatible with negative acknowledgements indicate that the negative acknowledgement signal is an invalid data packet, and that data packet integrity tests of the negative acknowledgement signal by nodes that are compatible with negative acknowledgements recognize the negative acknowledgement signal.

6. The method of claim 5, wherein the encoding is such that data packets for noncompatible nodes and compatible nodes have a first preamble and start of frame delimiter, and the negative acknowledgement signal has a second preamble and start of frame delimiter that is recognizable only by the compatible nodes.

7. The method of claim 5, wherein the encoding includes first and second cyclic redundancy checks (CRC), with the first CRC being positioned within the negative acknowledgement in a location that is examined by non-compatible and compatible nodes for correctness of the first CRC, the second CRC being positioned within the negative acknowledgement in a location that is examined only by compatible nodes for correctness of the second CRC, each negative acknowledgement having an incorrect first CRC and a correct second CRC.

8. The method of claim 1, further comprising encoding the negative acknowledgement to include a source address of the received data packet as a destination address of the negative acknowledgement such that only the transmitting node will respond to the negative acknowledgement.

9. The method of claim 1, further comprising determining whether the received data packet has a valid, non-collision length, and preventing responding with a negative acknowledgement when the received data packet has an invalid, collision length shorter than the non-collision length.

10. The method of claim 1, wherein examining destination address information includes determining whether the destination address information has an error.

11. The method of claim 10, wherein each conforming data packet has separate error detection information for the destination address information and for the data payload, the receiving node separately examining the error detection information for the destination address information and the error detection information for the data payload.

12. A system for transmitting and receiving data packets over a communication network between a transmitting node and a receiving node, the system comprising:

a transmitting node that transmits data packets, each conforming data packet containing destination address information and a data payload; and a receiving node that receives the data packets, the receiving node including logic for: determining whether a received data packet is uniquely addressed to that receiving node, determining whether the data payload contains an error, and immediately sending a negative acknowledgement when the received data packet is uniquely addressed to that receiving node and the data payload contains an error;

wherein the transmitting node and the receiving node operate on the network within access protocol rules for the network that define an interpacket time between data packets that each node is normally required to wait before attempting to transmit data on the network the step of immediately sending a negative acknowledgement including sending the negative acknowledgement prior to expiration of the interpacket time following receipt of the data packet at the receiving node.

\* \* \* \* \*

UNITED STATES PATENT AND TRADEMARK OFFICE
CERTIFICATE OF CORRECTION

PATENT NO. : 6,640,325 B1
DATED : October 28, 2003
INVENTOR(S) : Matthew J. Fischer It is certified that error appears in the above-identified patent and that said Letters Patent is hereby corrected as shown below:

<u>Column 9,</u>
Lines 44 and 45, after the word "node" insert -- operate on the network within access protocol rules for the network that define an --.

Signed and Sealed this

Thirteenth Day of December, 2005

JON W. DUDAS
*Director of the United States Patent and Trademark Office*